F. D. BROCKMAN & E. D. HOFFMAN.
FOLDING CRATE.
APPLICATION FILED MAY 5, 1910.
971,354.
Patented Sept. 27, 1910.
2 SHEETS—SHEET 1.
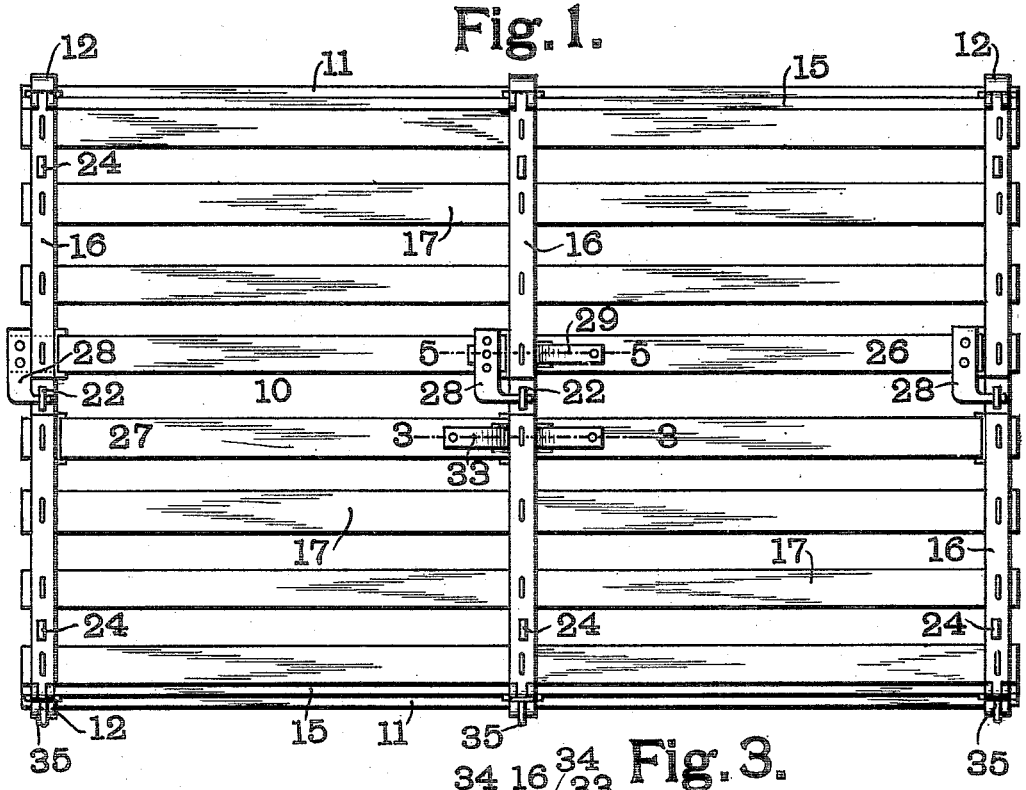
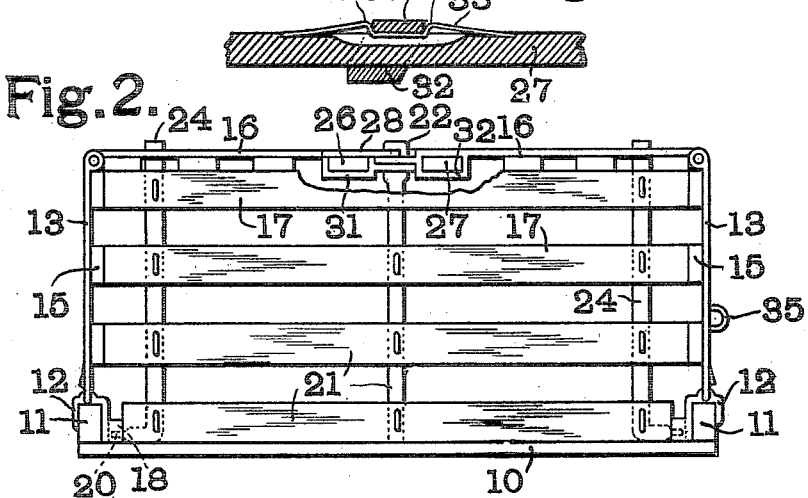
WITNESSES:
L. L. Mead
W. A. Alexander.
INVENTORS
F. D. Brockman
E. D. Hoffman
BY Fowler & Hoffman
ATTORNEYS
THE NORRIS PETERS CO., WASHINGTON, D. C.

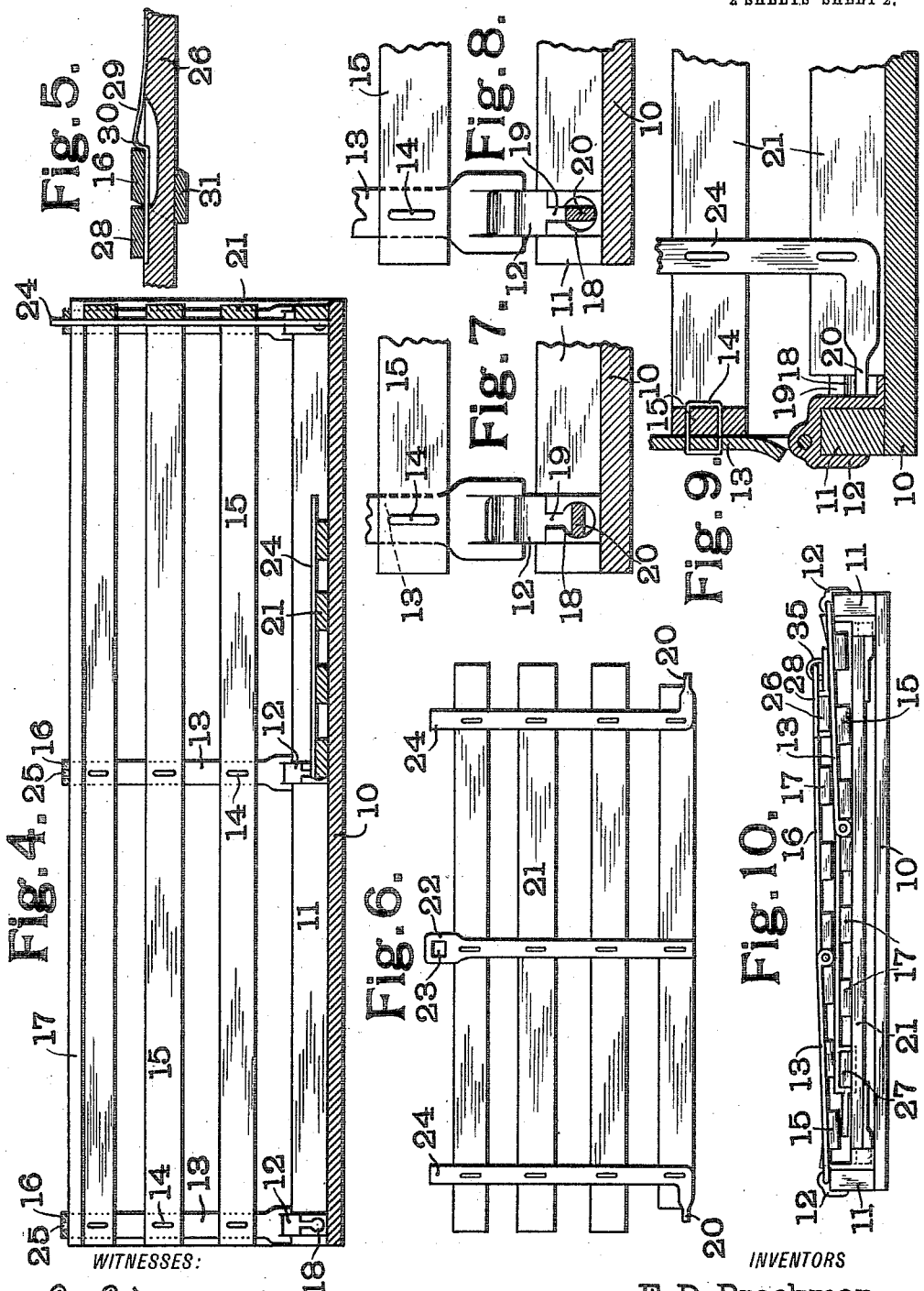

UNITED STATES PATENT OFFICE.

FREDERICK D. BROCKMAN, OF ST. LOUIS, AND EDWARD D. HOFFMAN, OF CAPE GIRARDEAU, MISSOURI.

FOLDING CRATE.

971,354.      Specification of Letters Patent.    Patented Sept. 27, 1910.

Application filed May 5, 1910. Serial No. 559,584.

*To all whom it may concern:*

Be it known that we, FREDERICK D. BROCKMAN, a citizen of the United States, residing at St. Louis, Missouri, and EDWARD D. HOFFMAN, a citizen of the United States, residing at Cape Girardeau, Missouri, have invented a certain new and useful Folding Crate, of which the following is such a full, clear, and exact description as will enable any one skilled in the art to which it appertains to make and use the same, reference being had to the accompanying drawings, forming part of this specification.

Our invention relates to folding crates of various kinds and is particularly adapted for use in connection with what is known as poultry coops. It may, however, be used for various kinds of crates including not only those specifically known to the trade as crates, but also those known as cases and coops.

In the accompanying drawings which illustrate one form of poultry coop made in accordance with our invention, Figure 1 is a top plan view; Fig. 2 is an end view, a portion of the coop being broken away; Fig. 3 is an enlarged section on the line 3—3 of Fig. 1; Fig. 4 is a vertical longitudinal section; Fig. 5 is an enlarged section on the line 5—5 of Fig. 1; Fig. 6 is a detailed view of one of the partitions; Figs. 7, 8 and 9 are enlarged sectional views showing details of construction, and Fig. 10 is an end view showing the coop in its folded position.

Like marks of reference refer to similar parts in the different views of the drawing.

10 represents the bottom of the coop, which may be made in any suitable way but is preferably solid. At each side of the bottom 10 is a rail 11 rigidly secured to the said bottom 10. Each of the rails 11 is provided with three brackets 12, one situated at each end and one at the middle, as best shown in Fig. 4. Each of the brackets 12 has pivoted to it a strap 13. The straps 13 form the uprights of the coop and have secured to them by means of staples 14, or otherwise, slats 15. Each of the straps 13 has hinged to its upper end a strap 16, as best shown in Fig. 1. The straps 16 have secured to them, slats 17 forming the top of the coop. The brackets 12 are each provided with a bearing 18, as best shown in Figs. 7, 8 and 9. Each of these bearings 18 is provided with a slot 19 through which may be passed a flat trunnion 20 carried on frames 21 which form the ends and central partition. Each of the frames 21, is provided with an upward projecting portion 22, having an eyelet 23, as best shown in Fig. 6. In addition to the central projection 22, each of the frames is also provided with a pair of side projections 24. These projections 22 and 24 pass through openings 25 in the straps 16, when the coop is in its normal position. The top contains besides the slats 17, two special slats 26 and 27 respectively. The slat 26 is provided with three hook-shaped members 28, the ends of which are adapted to engage with the eyes 23 in the projections 22, and thus lock the coop in its normal position.

In order to hold the slat 26 in locking position the said slat is provided with a spring detent 29 as shown in detail in Fig. 5. This detent is provided with a shoulder 30, which engages with the strap 16, as shown in Fig. 5. By depressing the detent 29 the shoulder 30 may be disengaged from the strap 16 so as to allow the slat to be moved out of its locking position. The strap 16 is provided with a loop 31 through which the slat 26 passes. This loop prevents the slat from being sprung away from the strap 16.

The slat 27 hereinbefore referred to is arranged adjacent to the slat 26 but is carried by the opposite side of the two-part top. This slat 27 slides in loops 32 similar to the loops 31 hereinbefore described, and formed on the straps 16 which carry the slats of the opposite side of the top. In order to normally prevent the movement of the slat 27, it is provided with a double spring detent 33 provided with a pair of locking shoulders 34, one adapted to engage with each side of the strap 16. By depressing the detent 33 the slat 27 can be slid in each direction so as to give access to each end of the coop. The straps 13 at the side of the two opposite slats 26 are provided with eyes 35 which are adapted to be engaged by the hooks 28, when the crate is in its folded position so as to firmly lock all the parts in their folded positions as is best shown in Fig. 10.

When it is desired to fold our coop the detent 29 is depressed so as to release the shoulder 30 from the strap 16, and the slat 26 is moved sufficiently to disengage the hooks 28 from the eyes 23 in the projection 22. This allows both sides of the top to be swung upward so as to give access to the entire interior of the coop. As the frames 21 forming the ends and central partition are now released they can be folded down against the bottom of the coop, as is shown in the central part of Fig. 4. While the frames are in this position they may be readily detached from the coop as the trunnions 20 are then in the position shown in Fig. 8 and can be withdrawn from their bearings through the slots 19. The coop can thus be readily and thoroughly cleaned. When, however, it is only desired to fold the coop into the smallest possible space, the said frames 21 are allowed to remain flat against the bottom, and the sides and top are folded over as shown in Fig. 10 and secured in this position by engaging the hooks 28 with the eyes 35.

Having fully described our invention, what we claim as new and desire to secure by Letters Patent of the United States, is:

1. In a folding crate, the combination with a bottom, of sides hinged to said bottom, a top formed of two sections each hinged to one of the sides, eyes carried by one side of one section of the top, a locking slat carried by the other section of the top and provided with hooks engaging with said eyes to lock the crate in either its normal or its folded position, and a sliding slat carried by the other part of the top and adapted to give access to the crate.

2. In a folding crate, the combination with a bottom, of sides eyes carried by one side of one section of the top, hinged to said bottom, a top formed of two sections each hinged to one of the sides, a locking slat carried by the other section of the top, hook-shaped members carried by said slat and limiting its movement in one direction, said members engaging with said eyes to lock the crate in either its normal or its folded position, a spring detent normally locking said slat against movement, a sliding slat carried by the other section of the top and adapted to give access to the coop, and a spring detent normally locking said sliding slat.

3. In a folding crate, the combination with a bottom, of sides hinged to said bottom, end-pieces and a central partition dividing said crate into two parts, a top formed of two sections each hinged to one of the sides, eyes carried by one side and one section of the top, a locking slat carried by one section of the top and provided with hooks engaging with said eyes to lock the crate in either its normal or folded position, and a sliding slat carried by the other part of the top and adapted to give access to either end of the crate.

In testimony whereof we have hereunto set our hands and seals this 22 day of April 1910 in the presence of the subscribing witnesses.

FREDERICK D. BROCKMAN. [L. S.]
    E. D. HOFFMAN. [L. S.]

Witnesses as to signature of Frederick D. Brockman:
 W. A. ALEXANDER,
 ELIZABETH BAILEY.

Witnesses as to signature of E. D. Hoffman:
 EMIL D. NUSCH,
 B. G. KRUEGER.